United States Patent
Yoshida et al.

(10) Patent No.: US 7,541,399 B2
(45) Date of Patent: Jun. 2, 2009

(54) PROCESS FOR PRODUCING POLYPHENYLENE ETHER RESIN COMPOSITION

(75) Inventors: Kazuo Yoshida, Chiba (JP); Takeshi Fujisawa, Kanagawa (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 331 days.

(21) Appl. No.: 10/573,980

(22) PCT Filed: Sep. 30, 2004

(86) PCT No.: PCT/JP2004/014371

§ 371 (c)(1),
(2), (4) Date: Mar. 30, 2006

(87) PCT Pub. No.: WO2005/030872

PCT Pub. Date: Apr. 7, 2005

(65) Prior Publication Data

US 2007/0060677 A1 Mar. 15, 2007

(30) Foreign Application Priority Data

Sep. 30, 2003 (JP) .......................... P2003-340199

(51) Int. Cl.
*C08K 5/521* (2006.01)
*C08K 5/524* (2006.01)
*C08K 5/5399* (2006.01)

(52) U.S. Cl. ...................... 524/127; 524/128; 524/138; 524/140; 524/147

(58) Field of Classification Search ................ 524/127, 524/128, 138, 140, 147
See application file for complete search history.

(56) References Cited

U.S. PATENT DOCUMENTS 6,258,879 B1   7/2001   Adedeji et al.

2002/0156182 A1   10/2002   Adedeji et al.

FOREIGN PATENT DOCUMENTS

| JP | 03 143953 A | 6/1991 |
| JP | 4-168142 | 6/1992 |
| JP | 4-173857 | 6/1992 |
| JP | 4-239547 | 8/1992 |
| JP | 4-239556 | 8/1992 |
| JP | 4-239557 | 8/1992 |
| JP | 4-239558 | 8/1992 |
| JP | 5-98147 | 4/1993 |
| JP | 05 098147 A | 4/1993 |
| JP | 05339420 A | * 12/1993 |
| JP | 06 032975 A | 2/1994 |
| JP | 6-192563 | 7/1994 |
| JP | 10-292053 | 11/1998 |
| JP | 11-335549 | 12/1999 |

* cited by examiner

*Primary Examiner*—Peter Szekely
(74) *Attorney, Agent, or Firm*—Finnegan, Henderson, Farabow, Garrett & Dunner, L.L.P.

(57) ABSTRACT

The invention relates to: a process for producing a poly(phenylene ether) resin composition which comprises (A) a poly(phenylene ether) and (B) a styrene resin and in which the styrene resin (B) is a styrene resin comprising a rubber-modified polystyrene containing a polybutadiene having 90% or higher cis-1,4 bonds, the process comprising a first step in which the poly(phenylene ether) (A) is melt-kneaded together with (B1) part or all of the styrene resin which does not include any rubber-modified polystyrene containing an unhydrogenated polybutadiene and a subsequent second step in which the remaining styrene resin including (B2) a rubber-modified polystyrene containing a polybutadiene having 90% or higher cis-1,4 bonds is melt-kneaded; and a poly(phenylene ether) resin composition obtained by the process. According to the invention, a modified PPE can be stably supplied which is free from various appearance failures such as black foreign particles, unmelted matter, and color unevenness and is excellent in practical properties such as stability to high-temperature residence, heat exposure resistance, and low-temperature impact resistance, in particular, heat deterioration resistance.

17 Claims, 1 Drawing Sheet

PROCESS FOR PRODUCING POLYPHENYLENE ETHER RESIN COMPOSITION

TECHNICAL FIELD

The present invention relates to a process for producing a poly(phenylene ether) resin composition and to a poly(phenylene ether) resin composition obtained by the process. More particularly, the invention relates to a process for poly (phenylene ether) resin composition production capable of providing a raw material which is inexpensive and has excellent mechanical properties, a satisfactory surface appearance, and satisfactory coatability, and to a resin composition obtained by the process.

BACKGROUND ART

Resin blends based on a poly(phenylene ether) and a styrene resin (hereinafter, the blends are referred to as modified PPE's) have any desired degree of heat resistance in the range of from the heat resistance of the styrene resin alone to that of the poly(phenylene ether) alone according to the blending ratio between the poly(phenylene ether) and the styrene resin. They are excellent in electrical properties, dimensional stability, impact resistance, acid resistance, alkali resistance, low water absorption, low specific gravity, etc. The modified PPE resins can be made flame-retardant without using any halogen compound and antimony trioxide, which are regarded as problematic because of their harmfulness. The resins are hence superior from the standpoints of environment and safety. Furthermore, these resins can be designed to be materials having high strength, high rigidity, and high heat resistance by adding an inorganic filler or inorganic reinforcement, and are used in various applications in all the world. Examples of the applications include parts for electrical/electronic appliances, parts for business machines, various exterior materials, and industrial articles.

In view of such recent circumstances in which modified PPE's are used in various applications all over the world, the modified PPE's to be supplied are desired to be produced in many parts of the world where the resins are consumed. Furthermore, with the recent trend toward size increase in domestic electrical appliances, there is a desire for a material which has excellent thermal stability and satisfactory appearance properties so as to be suitable for use as large molded articles such as, e.g., the housings of large television receivers, copiers, printers, and the like.

Incidentally, the properties of a modified PPE are considerably influenced by the properties of the rubber-modified polystyrene used as a main raw material in combination with a poly(phenylene ether) and by the process used for producing the modified PPE.

It has been known that when a polybutadiene containing 50% or higher cis-1,4 bonds and up to 10% 1,2-vinyl bonds is used for a rubber-modified polystyrene in producing a modified PPE, then excellent composition properties are obtained as compared with the case of using a polybutadiene containing a smaller amount of cis-1,4 bonds (e.g., patent document 1).

However, use of the rubber-modified polystyrene employing such a polybutadiene which is relatively easily available all over the world generally poses problems, for example, that the polybutadiene deteriorates during melt kneading and this reduces impact resistance and chemical resistance. It has therefore been necessary to strictly regulate the heat history in producing a modified PPE, and there have been limitations in mass-producing the resin using a high-rotation-speed extruder at a high shear rate.

In recent years, a modified PPE was developed which employs a rubber-modified polystyrene obtained using a partially hydrogenated conjugated diene rubber in which 5-70% by weight of all double bonds have been hydrogenated. This modified PPE is known to be excellent especially in thermal stability (e.g., patent document 2).

However, partially hydrogenated conjugated diene rubbers have a high glass transition temperature and, hence, there is a fear that these rubbers may adversely influence low-temperature impact resistance. In addition, compared to the rubber-modified polystyrenes heretofore in use, the rubber-modified polystyrene employing a partially hydrogenated conjugated diene rubber has had a problem that the production of the partially hydrogenated conjugated diene rubber is costly and, as a result, the cost of production of the modified PPE is high.

A technique for improving low-temperature impact resistance is known in which a rubber-modified polystyrene employing a conjugated diene rubber which has 90% or higher cis-1,4 bonds and a low glass transition temperature is used in combination with a rubber-modified polystyrene employing a partially hydrogenated conjugated diene rubber in which 5-70% by weight of all double bonds have been hydrogenated (e.g., patent document 3).

However, deterioration of the conjugated diene rubber having 90% or higher cis-1,4 bonds still proceeds and, hence, it has been necessary to strictly regulate the heat history in producing a modified PPE. It has been difficult to mass-produce the resin using a high-rotation-speed extruder at a high shear rate.

On the other hand, a process generally employed for producing a modified PPE comprises using an extruder, preferably a twin-screw extruder, to conduct melt kneading with heating. Recently, a high-rotation-speed extruder for mass production is coming to be mainly used.

Hitherto, modified PPE's have generally been produced in such a manner that a poly(phenylene ether), a styrene resin, and other additives are fed en bloc and these ingredients are melt-kneaded with relatively low shearing.

A technique was recently proposed which comprises a first stage in which an intermediate composition comprising a poly(phenylene ether) and a styrene resin and having a relatively high poly(phenylene ether) concentration is produced and a second stage in which the intermediate composition is melt-kneaded together with a styrene resin to produce a target poly(phenylene ether) resin composition (e.g., patent documents 4 to 7).

However, these production processes do not sufficiently reconcile excellent material properties with stable supply, and have been not always satisfactory with respect to various appearance failures such as black foreign particles, unmelted matter, and color unevenness and to practical properties such as stability to high-temperature residence and heat exposure resistance. Furthermore, those processes and compositions both have been insufficient with respect to the supply of a material conforming to global standards which is a recent important demand of customers, i.e., the stable supply of a modified poly(phenylene ether) PPE stably having excellent same properties to customer bases in all parts of the world.

Patent Document 1: JP-A-47-39456
Patent Document 2: JP-A-03-143953
Patent Document 3: JP-A-06-032975
Patent Document 4: JP-A-04-117444
Patent Document 5: JP-A-07-216100
Patent Document 6: JP-A-08-134261
Patent Document 7: JP-A-10-292053

DISCLOSURE OF THE INVENTION

An object of the invention is to provide a production process which enables the stable supply of a modified PPE which is free from various appearance failures such as black foreign particles, unmelted matter, and color unevenness and is excellent in practical properties such as stability to high-temperature residence, heat exposure resistance, and low-temperature impact resistance, in particular, heat deterioration resistance.

As a result of extensive investigations, the present inventor has found that a modified PPE having excellent practical properties and having highly stable properties can be stably supplied by a specific production process. The invention has been thus completed.

The invention provides:

[1] a process for producing a poly(phenylene ether) resin composition comprising (A) a poly(phenylene ether) and (B) a styrene resin, the styrene resin (B) being a styrene resin which comprises at least a rubber-modified polystyrene containing a polybutadiene having 90% or higher cis-1,4 bonds, the process comprising:

a first step of melt-kneading the poly(phenylene ether) (A) and a first styrene resin to thereby obtain a melt-kneading product, wherein the first styrene resin is a styrene resin at least 80% by weight of which is (B1) a rubber-modified polystyrene containing a hydrogenated polybutadiene and/or a styrene homopolymer; and a second step of melt-kneading the melt-kneading product with a second styrene resin, wherein the second styrene resin comprises (B2) a rubber-modified polystyrene containing a polybutadiene having 90% or higher cis-1,4 bonds;

[2] the process for producing a poly(phenylene ether) resin composition as described under [1] above wherein the polystyrene (B1) comprises a rubber-modified polystyrene containing a partially hydrogenated polybutadiene in which 5-70% of all double bonds have been hydrogenated;

[3] the process for producing a poly(phenylene ether) resin composition as described under [2] above wherein the second styrene resin further contains a styrene homopolymer;

[4] the process for producing a poly(phenylene ether) resin composition as described under any one of [1] to [3] above wherein (C) a phosphorus flame retardant is further added in the first step in an amount of 1-80 parts by weight per 100 parts by weight of the sum of the poly(phenylene ether) (A) and the first styrene resin;

[5] the process for producing a poly(phenylene ether) resin composition as described under any one of [1] to [4] above wherein (C) a phosphorus flame retardant and/or other additive(s) are further added in the second step;

[6] the process for producing a poly(phenylene ether) resin composition as described under [4] or [5] above wherein a phosphazene compound is used as the phosphorus flame retardant (C);

[7] the process for producing a poly(phenylene ether) resin composition as described under any one of [1] to [6] above wherein a polyolefin polymer is further added in the second step in an amount of 0.1-5 parts by weight;

[8] the process for producing a poly(phenylene ether) resin composition as described under any one of [1] to [7] above wherein a hydrogenated block copolymer derived from a block copolymer having at least one polymer block mainly comprising a vinylaromatic hydrocarbon and at least one polymer block mainly comprising a conjugated diene compound is further added in the second step in an amount of 0.1-15 parts by weight;

[9] the process for producing a poly(phenylene ether) resin composition as described under any one of [1] to [7] above wherein a hydrogenated block copolymer is further added in the second step in an amount of 0.1-15 parts by weight, the hydrogenated block copolymer being one which has been derived from a block copolymer having at least one polymer block mainly comprising a vinylaromatic hydrocarbon and at least one polymer block mainly comprising a conjugated diene compound and in which (a) the amount of vinyl bonds derived from the conjugated diene compounds in the unhydrogenated block copolymer is 10-70%, (b) the overall degree of hydrogenation of the unsaturated double bonds derived from the conjugated diene compounds is 60-85%, and (c) the content of monomer units derived from the vinylaromatic hydrocarbons in the unhydrogenated block copolymer is 20-60% by weight;

[10] the process for producing a poly(phenylene ether) resin composition as described under any one of [1] to [9] above wherein intermediate material pellets are produced after the melt kneading in the first step, and the intermediate material pellets are subjected to the melt kneading in the second step;

[11] the process for producing a poly(phenylene ether) resin composition as described under any one of [1] to [10] above wherein a phosphorus compound antioxidant is added in the second step;

[12] the process for producing a poly(phenylene ether) resin composition as described under [11] above wherein the phosphorus compound antioxidant to be added in the second step is a pentaerythritol diphosphite derivative;

[13] the process for producing a poly(phenylene ether) resin composition as described under [11] above wherein the phosphorus compound antioxidant to be added in the second step is bis(2,6-di-t-butyl-4-methylphenyl) pentaerythritol diphosphite;

[14] a poly(phenylene ether) resin composition obtained by the process as described under any one of [1] to [13] above;

[15] the poly(phenylene ether) resin composition as described under [14] above which has a glass transition temperature of −85° C. or lower, the glass transition temperature being attributable to the polybutadiene having 90% or higher cis-1,4 bonds; and

[16] an exterior part for a large television receiver or large copier, the exterior part comprising the poly(phenylene ether) resin composition as described under [14] or [15] above.

According to the invention, it has become possible to stably produce a poly(phenylene ether) resin composition which is less apt to have various appearance failures such as black foreign particles, unmelted matter, and color unevenness and is excellent in practical properties such as stability to high-temperature residence, heat exposure resistance, and low-temperature impact resistance.

BEST MODE FOR CARRYING OUT THE INVENTION

Figure 1:
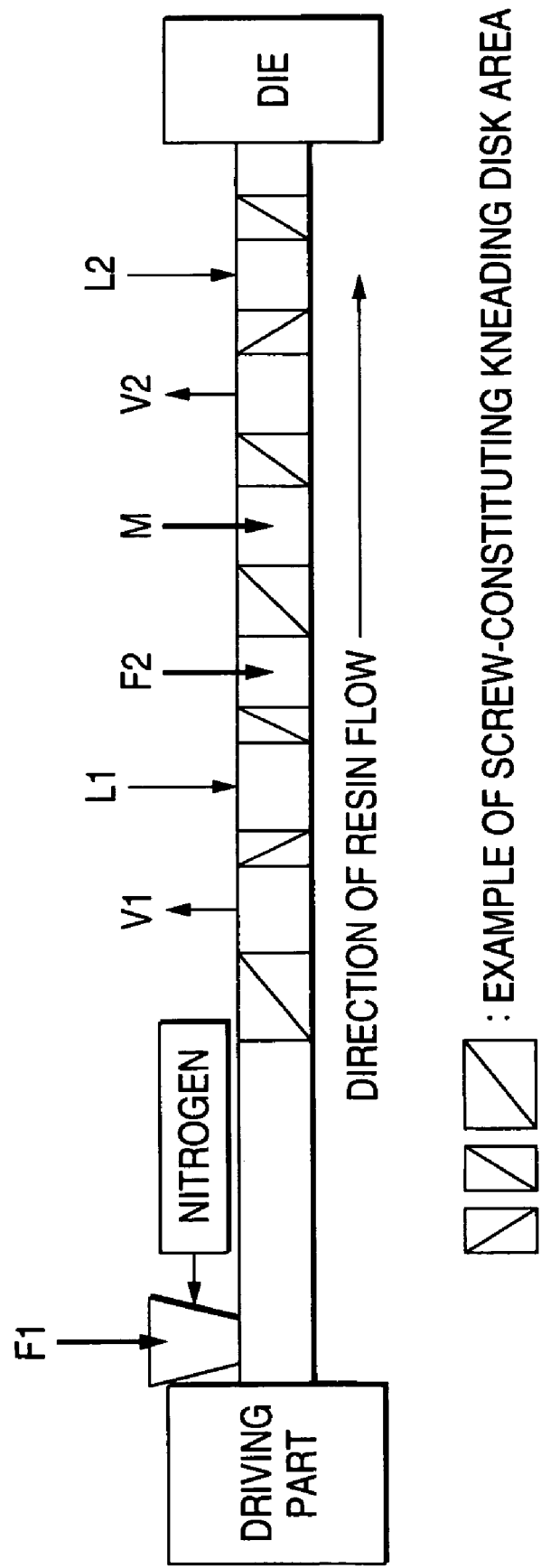
FIG. 1 is a diagrammatic view illustrating the twin-screw extruder used in the Examples and Comparative Examples. The signs have the following meanings: F1, first raw-material feed opening (top feed opening); F2, second raw-material feed opening (side feed opening); L1, first liquid-flame-retardant addition opening (injection nozzle); L2, second liquid-flame-retardant addition opening (injection nozzle); V1, first vent hole; V2, second vent hole; M, inorganic-filler feed opening.

The invention will be explained below in detail.

The process of the invention is a process for producing a poly(phenylene ether) resin composition which comprises (A) a poly(phenylene ether) and (B) a styrene resin comprising at least a rubber-modified polystyrene containing a polybutadiene having 90% or higher cis-1,4 bonds.

In the production process of the invention, the first step is a step in which the poly(phenylene ether) (A) is melt-kneaded together with (B1) part or all of the styrene resin which does not include any rubber-modified polystyrene containing an unhydrogenated polybutadiene to thereby obtain a mixture containing no unmelted poly(phenylene ether). In this first step, a phosphorus flame retardant (C) may be added and melt-kneaded according to need.

In the production process of the invention, the second step is a step in which the mixture obtained in the first step is melt-kneaded together with the styrene resin remaining unused in the first step which includes (B2) a rubber-modified polystyrene containing a polybutadiene having 90% or higher cis-1,4 bonds. In this step, a phosphorus flame retardant (C) may be added if necessary, and other additives may be further added according to need. The ingredients are melt-kneaded to obtain a poly(phenylene ether) resin composition having the final target makeup according to the invention (hereinafter referred to as final modified PPE).

In the production process of the invention, the extruder shown in FIG. 1 may be used as the only extruder to continuously conduct the first step and second step therein. It is, however, preferred to produce a final modified PPE by a successive production method which comprises conducting melt kneading in the first step to obtain a mixture as an intermediate material, subsequently obtaining intermediate material pellets made of the mixture, and then melt-kneading the intermediate material pellets in the second step together with the remaining styrene resin and optionally with a phosphorus flame retardant and other additives. This is because the later method is applicable to the production of final modified PPE's having a variety of properties.

It is preferred in the production process of the invention to conduct melt kneading while supplying an inert gas such as nitrogen or carbon dioxide to the raw-material feed openings (F1 and F2 in FIG. 1) of the extruder. This is highly effective in enhancing the freedom from black foreign particles and the thermal stability of the modified PPE to be obtained. The inert-gas introduction is especially effective in the first step.

Examples of the poly(phenylene ether) (A) to be used in the invention include the following homopolymers or copolymers. Typical homopolymer examples of the poly(phenylene ether) include poly(2,6-dimethyl-1,4-phenylene ether), poly(2-methyl-6-ethyl-1,4-phenylene ether), poly(2,6-diethyl-1,4-phenylene ether), poly(2-ethyl-6-n-propyl-1,4-phenylene ether), poly(2,6-di-n-propyl-1,4-phenylene ether), poly(2-methyl-6-n-butyl-1,4-phenylene ether), poly(2-ethyl-6-isopropyl-1,4-phenylene ether), poly(2-methyl-6-chloroethyl-1,4-phenylene ether), poly(2-methyl-6-hydroxyethyl-1,4-phenylene ether), and poly(2-methyl-6-chloroethyl-1,4-phenylene ether).

Preferred of these is poly(2,6-dimethyl-1,4-phenylene ether). Also preferred are the poly(phenylene ether)s shown in, e.g., JP-A-63-301222 which contain a 2-(dialkylaminomethyl)-6-methylphenylene ether unit, 2-(N-alkyl-N-phenylaminomethyl)-6-methylphenylene ether unit, or the like as a partial structure.

Examples of the copolymers include copolymers of 2,6-dimethylphenol and 2,3,6-trimethylphenol, copolymers of 2,6-dimethylphenol and o-cresol, or copolymers of 2,6-dimethylphenol, 2,3,6-trimethylphenol, and o-cresol.

Especially preferred from the standpoint of practical use is poly(2,6-dimethyl-1,4-phenylene ether) which has an intrinsic viscosity, as determined on 30° C. chloroform solution, in the range of 0.3-0.7, preferably in the range of 0.35-0.6. It is also possible to use a combination of two or more such polyethers differing in intrinsic viscosity so as to attain a widened molecular weight distribution.

Examples of ingredient (B1), i.e., a rubber-modified polystyrene containing a hydrogenated polybutadiene and/or a styrene homopolymer, to be used as or in the first styrene resin in the first step in the invention include styrene homopolymers, copolymers of styrene and a copolymerizable vinyl compound, and graft copolymers represented by rubber-modified polystyrenes. These may be used alone or in combination. A most useful, preferred rubber-modified polystyrene is a rubber-modified polystyrene containing a partially hydrogenated polybutadiene in which 5-70% of all double bonds have been hydrogenated. The proportion of the polystyrene (B1) to the whole first styrene resin to be added in the first step should be 80% by weight or higher.

Although the first step can be conducted without using the rubber-modified polystyrene, it is desirable to use it for obtaining better impact resistance. The useful rubber-modified polystyrene for use in the first step in the invention is a rubber-modified polystyrene containing a partially hydrogenated polybutadiene in which 5-70%, preferably 15-60%, more preferably 25-45%, of all double bonds have been hydrogenated. A rubber-modified polystyrene containing an unhydrogenated polybutadiene may also be used as part of the styrene resin to be used in the first step. However, the proportion of the rubber-modified polystyrene containing an unhydrogenated polybutadiene to be used should be 20% by weight or lower, more preferably 10% by weight or lower, based on the whole styrene resin to be used in the first step, in order to accomplish the object of the invention. Especially preferably, the polystyrene modified with an unhydrogenated polybutadiene should not be used.

In case where a general rubber-modified polystyrene usually on the market, i.e., a rubber-modified polystyrene containing an unhydrogenated polybutadiene, is used as the only polymer constituting the first styrene resin, the result is impaired heat deterioration resistance and the invention is not achieved.

The rubber-modified polystyrene to be used in the invention is described in detail in Japanese Patent 2902424. The partially hydrogenated polybutadiene to be used for the rubber-modified polystyrene desirably is one in which 5-70% of all double bonds have been hydrogenated, the amount of 1,2-vinyl bonds is 3% by weight or smaller, preferably 2% by weight or smaller, and the amount of unhydrogenated 1,4-bonds is 30% by weight or larger. As long as the degree of hydrogenation of all double bonds is 5% by weight or higher, the effect of partial hydrogenation is sufficiently produced.

The second styrene resin to be used in the second step in the invention comprises, as an essential ingredient, (B2) a rubber-modified polystyrene containing a polybutadiene having 90% or higher cis-1,4-bonds. However, ingredient (B2) may be used in combination with a styrene resin such as, e.g., a rubber-modified polystyrene containing an unhydrogenated polybutadiene, a styrene homopolymer, or a copolymer of styrene and a copolymerizable vinyl compound. Furthermore, the rubber-modified polystyrene containing a partially hydrogenated polybutadiene used in the first step may be added also in the second step as long as it is used in such a small amount as not to lessen the features of the production process of the invention.

In the rubber-modified polystyrene (B2), the content of the polybutadiene having 90% or higher cis-1,4 bonds is preferably 5-25% by weight, more preferably 7-20%, especially preferably 9-15% by weight. In general, rubber-modified polystyrenes having a rubber content of 25% by weight or higher are difficult to produce commercially.

In the resin composition of the invention, the content of the rubber-modified polystyrene (B2) containing a polybutadiene having 90% or higher cis-1,4 bonds varies depending on the mechanical properties required. However, the content thereof is generally 1-80 parts by weight, preferably 2-70 parts by weight, especially preferably 3-60 parts by weight, per 100 parts by weight of the resin composition.

In general, the microstructure of a polybutadiene is governed by the polymerization conditions, e.g., the kind of the catalyst, used in butadiene polymerization. Polybutadienes having a relatively small amount of cis-1,4 bonds and having a large amount of vinyl bonds and trans-1,4 bonds are apt to undergo thermal crosslinking and have poor thermal stability. These polybutadienes are hence undesirable in the poly(phenylene ether) resin composition of the invention.

The larger the cis-1,4 bond amount in the polybutadiene having 90% or higher cis-1,4 bonds, the more the polybutadiene is preferred. Polybutadienes having large cis-1,4 bond amounts generally on the market have about 95% or higher cis-1,4 bonds. Especially preferred is a polybutadiene having about 97% or higher cis-1,4 bonds. Polybutadienes having 90% or higher cis-1,4 bonds have a lower glass transition point than polybutadienes having a small amount of cis-1,4 bonds and, hence, the rubber-modified polystyrenes containing these polybutadienes have the excellent ability to improve impact resistance, in particular, low-temperature impact resistance. The production process of the invention is highly excellent in obtaining this useful property.

The styrene resin to be used in the second step can comprise a combination of the rubber-modified polystyrene (B2), which contains a polybutadiene having 90% or higher cis-1,4 bonds as described above, with other styrene resins. For example, use of a combination with an inexpensive styrene homopolymer is economically advantageous in the case where impact resistance is not very important.

The rubber-modified polystyrenes to be used in the first step and second step in the invention can be obtained by a conventionally known general process for rubber-modified polystyrene production in which either styrene or styrene and a compound copolymerizable therewith are polymerized in the presence of the polybutadiene rubber. Specifically, the polybutadiene rubber is dissolved in an amount of 1-15% by weight in styrene and an ingredient optionally mixed therewith which comprise a styrene-copolymerizable compound or a solvent. The resultant rubber solution is graft-polymerized. Thereafter, the monomers remaining unreacted and the solvent are removed to thereby produce the rubber-modified polystyrene. It is a matter of course that rubber ingredients other than that shown above can be further used as long as this does not exert an adverse influence.

Examples of the compound copolymerizable with styrene include styrene compounds such as α-methylstyrene, 2,4-dimethylstyrene, monochlorostyrene, p-methylstyrene, p-tert-butylstyrene, and ethylstyrene; methacrylic esters such as methyl methacrylate and ethyl methacrylate; unsaturated nitrile compounds such as acrylonitrile and methacrylonitrile; and acid anhydrides such as maleic anhydride. The amount of the copolymerizable compound to be used together with styrene is preferably 20% by weight or smaller, more preferably 15% by weight or smaller, based on the sum of the styrene and the copolymerizable compound.

The rubber-modified polystyrene to be used in the invention preferably is one which has a volume-average dispersed-rubber-particle diameter in the range of about 0.05-3 μm, more preferably in the range of 1-2 μm. In some cases, it is preferred to use one having a rubber particle diameter of 0.05-1.5 μm and one having a rubber particle diameter of 2-4 μm in combination.

Examples of the phosphorus flame retardant (C) for use in the invention include red phosphorus, organic phosphoric ester compounds, phosphazene compounds, and phosphoramide compounds.

Examples of the organic phosphoric ester compounds include triphenyl phosphate, phenyl bisdodecyl phosphate, phenyl bisneopentyl phosphate, phenyl bis(3,5,5'-trimethylhexyl phosphate), ethyl diphenyl phosphate, 2-ethylhexyl di(p-tolyl) phosphate, bis(2-ethylhexyl) p-tolyl phosphate, tritolyl phosphate, bis(2-ethylhexyl)phenyl phosphate, tri(nonylphenyl) phosphate, di(dodecyl) p-tolyl phosphate, tricresyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, bisphenol A bis (diphenyl phosphate), diphenyl(3-hydroxyphenyl) phosphate, bisphenol A bis(dicresyl phosphate), resorcinol bis (diphenyl phosphate), resorcinol bis(dixylenyl phosphate), 2-naphthyl diphenyl phosphate, 1-naphthyl diphenyl phosphate, and di(2-naphthyl)phenyl phosphate. Of these, the phosphoric ester compounds of resorcinol and bisphenol A are preferred from the standpoints of volatility and heat resistance.

The phosphazene compounds are compounds having a cyclic or linear structure represented by general formula (I). However, compounds of a cyclic structure are preferred. Especially preferred are 6-membered and 8-membered phenoxyphosphazene compounds in which n is 3 and 4.

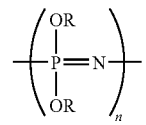
[Ka-1]

(In the formula, R's each independently represent an aliphatic or aromatic group having 1-20 carbon atoms, and n is an integer of 3 or larger.)

Those compounds may have been crosslinked with a crosslinking group selected from the group consisting of phenylene, biphenylene, and the group shown below.

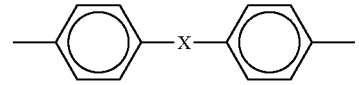
[Ka-2]

(In the formula, X represents —C(CH$_3$)$_2$—, —SO$_2$—, —S—, or —O—.)

The phosphazene compounds represented by general formula (I) are known compounds and are described in, e.g., James E. Mark, Harry R. Allcock, and Robert West, *Inorganic Polymers*, Prentice-Hall International, Inc., 1992, pp. 61-140. Synthesis examples for obtaining such phosphazene compounds are disclosed in JP-B-3-73590, JP-A-9-71708, JP-A-9-183864, JP-A-11-181429, etc. The phosphazene compounds are more preferred from the standpoints of flame retardancy and heat resistance.

An antidripping agent may be contained as a flame retardant aid (D) in the resin composition of the invention according to need. This antidripping agent is an additive which serves to inhibit dripping during combustion, and a known one can be used. The antidripping agent may be added in an amount in the range of 0.01-5 parts by weight, preferably 0.05-3 parts by weight, per 100 parts by weight of the sum of the poly(phenylene ether) and the styrene resin (including any recovered styrene resin and virgin material).

Especially preferred in the invention is one which forms a fibril structure in the poly(phenylene ether) resin and is represented by polytetrafluoroethylene (PTFE) and the like. This is because this kind of antidripping agent is highly effective in dripping inhibition. The resin composition containing such an antidripping agent has highly excellent flame retardancy. Preferred forms of polytetrafluoroethylene (PTFE) are ones having excellent dispersibility, such as, e.g., one obtained by emulsifying/dispersing PTFE in a medium such as water and one obtained by encapsulating PTFE with an acrylic ester resin, methacrylic ester resin, styrene/acrylonitrile copolymer resin, or the like. This is because use of PTFE in such a form imparts a satisfactory surface appearance to molded articles formed from the modified PPE resin.

The form obtained by emulsifying/dispersing PTFE in a medium such as water is not particularly limited. However, it preferably is one in which the PTFE has an average particle diameter of 1 μm or smaller. The average particle diameter thereof especially preferably is 0.5 μm or smaller. Examples of commercial products of such PTFE forms include Teflon (registered trademark) 30J (trade name; Mitsui DuPont Fluorochemicals Co.), Polyflon D-2C (trade name; Daikin Industries, Ltd.), and Aflon AD1 (trade name; Asahi Glass Co., Ltd.).

The form obtained by emulsifying/dispersing PTFE in a solution such as water is not particularly limited. However, it preferably is one in which the PTFE has an average particle diameter of 1 μm or smaller. The average particle diameter thereof especially preferably is 0.5 μm or smaller. Examples of commercial products of such PTFE forms include Teflon (registered trademark) 30J (trade name; Mitsui DuPont Fluorochemicals Co.), Polyflon D-2C (trade name; Daikin Industries, Ltd.), and Aflon AD1 (trade name; Asahi Glass Co., Ltd.).

Such polytetrafluoroethylene may be produced by a known method (see the description of U.S. Pat. No. 2,393,967). Specifically, a free-radical catalyst such as, e.g., sodium, potassium, or ammonium peroxydisulfate is used to polymerize tetrafluoroethylene in an aqueous medium at a pressure of 0.7-7 MPa under the temperature conditions of 0-200° C., preferably 20-100° C., whereby polytetrafluoroethylene can be obtained as a white solid.

Such polytetrafluoroethylene desirably is one having a molecular weight of 100,000 or higher, preferably about 200,000-3,000,000. Polytetrafluoroethylene having such a molecular weight inhibits the resin composition containing it from dripping during combustion. Furthermore, use of polytetrafluoroethylene in combination with a silicone resin is more effective in dripping inhibition than in the case of adding polytetrafluoroethylene alone and, in addition, can attain a reduced combustion time.

Ingredient proportions in the first step in the invention are important for preventing the powdery poly(phenylene ether) from leaving an unmelted matter and for obtaining a final composition of any of various makeups in the second step. In the case where a phosphorus flame retardant is not contained, the [powdery poly(phenylene ether)]/[first styrene resin] is preferably (50-95 parts by weight)/(50-5 parts by weight), more preferably (55-90 parts by weight)/(45-10 parts by weight). In the case where a phosphorus flame retardant is contained, it is preferred that the [powdery poly(phenylene ether)]/[first styrene resin] should be (50-99 parts by weight)/(50-1 part by weight) and the proportion of the phosphorus flame retardant be 1-80 parts by weight per 100 parts by weight of the sum of these two ingredients. More preferably, the [powdery poly(phenylene ether)]/[first styrene resin] is (50-95 parts by weight)/(45-5 parts by weight) and the proportion of the phosphorus flame retardant is 2-65 parts by weight per 100 parts by weight of the sum of these.

Positions in which a phosphorus flame retardant is added in the first step in the invention are not particularly limited. However, for preventing the powdery poly(phenylene ether) from leaving an unmelted matter, it is preferred to add the flame retardant after the powdery poly(phenylene ether) (fed through F1 in FIG. 1) has melted, i.e., to add the flame retardant through internal parts of the extruder barrel (L1 and L2 in FIG. 1).

The final modified PPE to be obtained by the invention is obtained through the second step in which the intermediate material pellets of one or more kinds obtained in the first step are melt-kneaded together with a styrene resin comprising a rubber-modified polystyrene (B2) containing a polybutadiene having 90% or higher cis-1,4 bonds and optionally with a phosphorus flame retardant and other additives.

Other additives may be added in the invention in order to further improve properties. Examples of such other ingredients include elastomers for improving impact resistance, inorganic fillers and reinforcements for improving rigidity and dimensional stability, ultraviolet absorbers and light stabilizers for improving light resistance, and heat stabilizers for improving thermal stability. Such additives are suitably added according to need.

The poly(phenylene ether) resin composition to be obtained in the invention, i.e., the target final modified PPE, varies in ingredient proportions according to intended applications of the composition. For use in applications where flame retardancy is not required, the [poly(phenylene ether)]/[sum of the first and second styrene resins] may be (5-95 parts by weight)/(95-5 parts by weight), and is preferably (10-85 parts by weight)/(90-15 parts by weight). For use in applications where flame retardancy is required, the [poly(phenylene ether)]/[sum of the first and second styrene resins] may be (5-95 parts by weight)/(95-5 parts by weight) and the proportion of the phosphorus flame retardant may be 1-50 parts by weight per 100 parts by weight of the sum of these ingredients. Preferably, the [poly(phenylene ether)]/[sum of the first and second styrene resins] is (10-85 parts by weight)/(90-15 parts by weight) and the proportion of the phosphorus flame retardant is 3-35 parts by weight per 100 parts by weight of the sum of these ingredients. The proportions of the individual ingredients are suitably determined while taking account of heat resistance also.

A preferred extruder for use in the first step in the invention is a vented twin-screw extruder of the corotating or counter-rotating type. The extruder screws have a constitution having mixing zones suitably disposed. The rotation speed is suitably determined while taking account of the necessary shearing force and extrusion rate. The set temperature in the first step is generally in the range of 240-340° C., preferably in the range of 260-320° C.

The invention is effective when a poly(phenylene ether) resin composition is produced through the first step in which a twin-screw extruder having a screw diameter of 40 mm or larger, in particular, a screw diameter of 70 mm or larger, is used to knead the materials at a high rotation speed of 50 cm/sec or higher, in particular, 100 cm/sec or higher in terms of screw peripheral speed, i.e., at a high shearing force. Since the screws can be rotated at a high speed, productivity can be increased and the resin composition obtained has excellent properties. When a small extruder having a diameter smaller than 40 mm is used, the performances of the composition are not especially inferior even when produced by a process heretofore in use. However, use of such a small extruder results in reduced productivity and is not practical commercially. Furthermore, in production processes heretofore in use, when the screw rotation speed is heightened or a large extruder is used in order to increase productivity, heat generation by kneading is enhanced. The mounting of a kneading disk for improving kneading ability is limited in order to inhibit the resin composition to be obtained from decreasing in properties, resulting in a reduced extrusion rate, etc. Because of these, productivity has been limited for the size of the extruder.

In the case where the intermediate material pellets obtained in the first step are used to produce the target composition in two stages in the invention, either of a single-screw extruder and a corotating or counterrotating twin-screw extruder can be employed as the extruder to be used in the second step. These extruders more preferably are vented extruders.

Weaker shearing than in the first step suffices for the second step. The set temperature in the second step is generally in the range of 220-300° C. The screw constitution, rotation speed, and extrusion temperature are regulated so that the resin temperature is preferably 320° C. or lower, more preferably 300° C. or lower. Because kneading in the second step is conducted while regulating the resin temperature so as not to exceed that temperature, a composition which has suffered little thermal deterioration and has excellent resin properties is obtained.

A feature of the invention resides in that an extruder having a low shearing force or screws having a low shearing force can be used in the second step and, as a result, resin deterioration can be highly inhibited to thereby obtain a composition having excellent resin properties.

In the poly(phenylene ether) resin composition of the invention thus produced, the glass transition point attributable to the polybutadiene having 90% or higher cis-1,4 bonds has increased little due to thermal deterioration of the polybutadiene. The resin composition hence shows a low glass transition point. The glass transition temperature attributable to the polybutadiene having 90% or higher cis-1,4-bonds is preferably −85° C. or lower, more preferably −90° C. or lower. The poly(phenylene ether) resin composition of the invention is excellent in resin properties, in particular, thermal stability, resistance to thermal deterioration caused by, e.g., exposure to high temperatures, and impact resistance especially at low temperatures.

The production process of the invention is highly excellent in the point described above and is exceedingly profitable commercially.

In the invention, the glass transition temperature attributable to a polybutadiene was measured by the method described in the Examples which will be given later.

Examples of the additives of other kinds which may be added in the invention in order to further improve properties include elastomers for improving impact resistance, inorganic fillers and reinforcements for improving rigidity and dimensional stability, ultraviolet absorbers and light stabilizers for improving light resistance, and heat stabilizers for improving thermal stability. Such additives are suitably added according to need.

A rubbery polymer can be added as an impact modifier to the resin composition of the invention. Examples of the rubbery polymer include styrene/butadiene block copolymers, styrene/isoprene block copolymers, hydrogenation products obtained from these, natural rubber, polyisoprene rubber, polybutadiene rubber, styrene/butadiene rubbers, ethylene/propylene rubbers, chloroprene rubbers, acrylic rubbers, isoprene/isobutylene rubbers, polypentenamer rubbers, and other synthetic rubbers. Preferred of these from the standpoint of improving impact resistance are hydrogenated styrene/butadiene block copolymers and hydrogenated styrene/isoprene block copolymers.

A hydrogenated block copolymer to be used in the invention is a hydrogenated product of a block copolymer having at least one, preferably two or more polymer blocks mainly comprising a vinylaromatic hydrocarbon and at least one polymer block mainly comprising a conjugated diene compound. The vinylaromatic hydrocarbons are one or more members selected from styrene, alkylstyrenes such as α-methylstyrene, p-methylstyrene, and p-tert-butylstyrene, p-methoxystyrene, vinylnaphthalene, and the like. Preferred of these is styrene. The conjugated diene compounds are diolefins having a pair of conjugated double bonds, and examples thereof include 1,3-butadiene, 2-methyl-1,3-butadiene (isoprene), 2,3-dimethyl-1,3-butadiene, 1,3-pentadiene, and 1,3-hexadiene. Especially general examples thereof include 1,3-butadiene and isoprene. These may be used either alone or in combination of two or more thereof.

In the hydrogenated block copolymer to be used in the invention, examples of processes for producing the block copolymer which has not been hydrogenated include the processes described in, e.g., JP-B-36-19286, JP-B-43-17979, JP-B-46-32415, JP-B-49-36957, JP-B-56-28925, and JP-A-59-166518. By these processes, the block copolymer is obtained as block copolymers represented by the following general formulae.

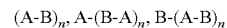

(In the formulae, A is a polymer block mainly comprising a vinylaromatic hydrocarbon, and B is a polymer block mainly comprising a conjugated diene compound. The boundary between block A and block B need not be always clear. Symbol n generally is an integer of 1-5.) Alternatively, block copolymers represented by the following general formulae are obtained.

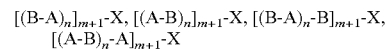

(In the formulae, A, B, and n have the same meanings as defined above; and X represents, for example, a residue of a coupling agent such as silicon tetrachloride, tin tetrachloride, epoxidized soybean oil, di- to hexafunctional epoxy compound, polyhalogenated hydrocarbon, carboxylic acid ester, or polyvinyl compound, e.g., divinylbenzene or a residue of an initiator such as a polyfunctional organolithium compound. Symbol m is an integer of 1 or larger, generally 1-10.)

The term polymer block mainly comprising a vinylaromatic hydrocarbon used above means either of a vinylaromatic hydrocarbon/conjugated diene compound copolymer block containing at least 50% by weight, preferably at least 70% by weight, monomer units derived from a vinylaromatic hydrocarbon and a vinylaromatic hydrocarbon homopolymer block. The term polymer block mainly comprising a conjugated diene compound means either of a conjugated diene compound/vinylaromatic hydrocarbon copolymer block containing monomer units derived from a conjugated diene compound in an amount exceeding 50% by weight, preferably 70% by weight or larger, and a conjugated diene compound homopolymer block.

In the copolymer block, the monomer units derived from a vinylaromatic hydrocarbon may be distributed evenly or in a tapered arrangement. In this copolymer part, two or more parts in which monomer units derived from a vinylaromatic hydrocarbon are evenly distributed may coexist with two or more parts in which such monomer units are distributed in a tapered arrangement. Hydrogenation products of two or more block copolymers represented by any of those general formulae can be used in combination in any desired proportion as the hydrogenated block copolymer to be used in the invention.

In the invention, the amount of vinyl bonds derived from the conjugated diene compound in the unhydrogenated block copolymer is preferably 10-70%, more preferably 15-60%, especially preferably 25-50%. The amount of vinyl bonds means the proportion of those units of the conjugated diene compound which have been incorporated into the block copolymer by 1,2-bonding and 3,4-bonding to the conjugated diene compound incorporated in the bonding modes of 1,2-bonding, 3,4-bonding, and 1,4-bonding. Vinyl bond amounts smaller than 10% or exceeding 70% are undesirable because the result is a hydrogenated block copolymer having a poor affinity for the poly(phenylene ether) and styrene resins. The amount of vinyl bonds can be regulated in block copolymer production by using an ether compound, such as dimethyl ether, diethyl ether, diphenyl ether, tetrahydrofuran, diethylene glycol dimethyl ether, or diethylene glycol dibutyl ether, a tertiary amine, such as trimethylamine, triethylamine, N,N,N',N'-tetramethylethylenediamine, or diazobicyclo[2.2.2]octane, or the like as a vinylating agent.

The hydrogenated block copolymer to be used in the invention is obtained by hydrogenating the block copolymer described above (hydrogenation reaction). Known as catalysts usable in the hydrogenation reaction are (1) supported type heterogeneous catalysts comprising carbon, silica, alumina, diatomaceous earth, or the like and, supported thereon, a metal such as Ni, Pt, Pd, or Ru, (2) so-called Ziegler catalysts comprising a combination of a transition metal salt such as an organic acid salt or acetylacetone salt of Ni, Co, Fe, Cr, or the like and a reducing agent such as an organoaluminum, and (3) homogeneous catalysts such as so-called organometal complexes, e.g., organometallic compounds of Ti, Ru, Rh, Zr, or the like. Examples of methods for the hydrogenation reaction include the methods described in JP-B-42-8704, JP-B-43-6636, JP-B-63-4841, JP-B-1-37970, JP-B-1-53851, and JP-B-2-9041. The block copolymer is hydrogenated in a hydrocarbon solvent in the presence of a hydrogenation catalyst, whereby a hydrogenation product can be obtained. In this reaction, the degree of hydrogenation of the block copolymer can be controlled by regulating the reaction temperature, reaction time, hydrogen feed rate, catalyst amount, etc.

The hydrogenated block copolymer to be used in the invention is one in which the overall degree of hydrogenation of the unsaturated double bonds derived from the conjugated diene compound is desirably 60-85%, preferably 65-85%. Overall degrees of hydrogenation lower than 60% result in poor thermal stability. When the overall degree of hydrogenation is 60-85%, an excellent balance among chemical resistance, flowability, impact resistance, etc. is attained.

Furthermore, in the hydrogenated block copolymer in the invention, it is preferred that the degree of hydrogenation of the vinyl bond parts derived from the conjugated diene compound before hydrogenation should be regulated to 90% or higher, preferably 95% or higher. In case where the degree of hydrogenation of the vinyl bond parts is lower than 90%, this block copolymer is undesirable because it has poor thermal stability. The degree of hydrogenation of the vinyl bond parts means the proportion of the amount of hydrogenated vinyl bonds to the amount of the vinyl bonds derived from the conjugated diene compound incorporated in the unhydrogenated block copolymer.

Incidentally, the degree of hydrogenation of the aromatic double bonds derived from the vinylaromatic hydrocarbon in the block copolymer is not particularly limited. It is, however, preferred that the degree of hydrogenation thereof should be regulated to 50% or lower, preferably 30% or lower, more preferably 20% or lower. The degree of hydrogenation can be known with an infrared spectrophotometer, nuclear magnetic resonance apparatus (NMR), etc.

In the unhydrogenated block copolymer to be used in the invention, the content of monomer units derived from the vinylaromatic hydrocarbon is preferably 20-60% by weight, more preferably 25-50% by weight. In case where the content of monomer units derived from the vinylaromatic hydrocarbon is lower than 20% by weight, this copolymer gives a hydrogenated block copolymer having poor compatibility with the modified PPE. Contents thereof exceeding 60% by weight result in poor chemical resistance and poor impact resistance. However, in the case where the hydrogenated block copolymer is added in combination with a polyolefin polymer, the content of monomer units derived from the vinylaromatic hydrocarbon is preferably 25-90% by weight, more preferably 30-80% by weight.

The melt flow rate (in accordance with ASTM-D-1238; 230° C.; 2.16-kg load) of the hydrogenated block copolymer to be used in the invention is preferably 10 g/10 min or lower, more preferably 2 g/10 min or lower. In case where the MFR thereof exceeds 10 g/10 min, impact resistance becomes poor. With respect to the lower limit of the melt flow rate of the copolymer, it is difficult to specify the value thereof because found values not higher than 0.1 g/10 min have no accuracy. However, one having an MFR of 0.1 g/10 min or lower may also be used in the invention.

The practical range of the number-average molecular weight of the hydrogenated block copolymer is preferably 40,000-300,000, more preferably 50,000-250,000, especially preferably 60,000-200,000, in terms of peak molecular weight as determined through measurement by GPC and calculation for standard polystyrene.

From the solution of a hydrogenated block copolymer obtained by the method described above, the solvent is removed in an ordinary manner. Thus, the hydrogenated block copolymer for use in the invention can be obtained. According to need, a deliming step for metals can be employed. Furthermore, a reaction terminator, antioxidant, neutralizing agent, surfactant, and the like may be used according to need.

The hydrogenated block copolymer to be used in the invention includes a functional polymer comprising a polymer and bonded thereto a functional group containing a polar group selected from nitrogen, oxygen, silicon, phosphorus, sulfur, and tin and a functional block copolymer obtained by modifying a hydrogenated block copolymer with a modifying agent such as maleic anhydride.

A known naphthenic or paraffinic process oil and a mixture of such oils can be incorporated as a softener or processing aid into the hydrogenated block copolymer for use in the invention.

A preferred rubbery polymer to be added to the resin composition of the invention, among the polymers described above, is the styrene/butadiene block copolymer or the styrene/isoprene block copolymer. The preferred range of the amount of the rubbery polymer to be added is 0.1-15 parts by weight, more preferably 0.1-10 parts by weight, even more preferably 0.5-5 parts by weight, especially preferably 0.5-3 parts by weight, per 100 parts by weight of the resin composition.

A polyolefin polymer can be added to the composition of the invention. Preferred examples thereof include ethylene homopolymers, ethylene/α-olefin copolymers, and ethylene/acrylic ester copolymers. Especially preferred are polyethylene, ethylene/propylene copolymers, ethylene/butene copolymers, ethylene/octane copolymers, and ethylene/ethyl methacrylate copolymers. One or more of these can be used. These polyolefin polymers often serve to improve releasability from molds in injection molding.

The addition of a styrene/butadiene block copolymer or styrene/isoprene block copolymer and a hydrogenation product thereof in combination with a polyolefin or olefin copolymer is especially preferred because it produces a synergistic effect on impact resistance and releasability. Especially preferred rubbery polymers to be added and used in combination with a polyolefin or olefin copolymer are products of the hydrogenation of a styrene/butadiene block copolymer and a styrene/isoprene block copolymer in each of which the styrene block has a number-average molecular weight of 15,000 or higher. The amount of the polyolefin polymer to be added is preferably 0.1-5 parts by weight, more preferably 0.5-3 parts by weight, per 100 parts by weight of the resin composition.

Stabilizers such as an antioxidant, ultraviolet absorber, and light stabilizer can be added to the composition of the invention to improve the thermal stability and light resistance of the composition.

Examples of the antioxidant include hindered phenol antioxidants such as 2,6-di-t-butyl-4-methylphenol, n-octadecyl 3-(4'-hydroxy-3',5'-di-t-butylphenyl)propionate, 2,2'-methylenebis(4-methyl-6-t-butylphenol), 2,2'-methylenebis(4-ethyl-6-t-butylphenol), 2,4-bis[(octylthio)methyl]-o-cresol, 2-t-butyl-6-(3-t-butyl-2-hydroxy-5-methylbenzyl)-4-methylphenyl acrylate, 2,4-di-t-amyl-6-[1-(3,5-di-t-amyl-2-hydroxyphenyl)ethyl]phenyl acrylate, and 2-[1-(2-hydroxy-3,5-di-tert-pentylphenyl)]acrylate; sulfur compound antioxidants such as dilauryl thiodiprobionate, lauryl stearyl thiodipropionate and pentaerythritol tetrakis(β-laurylthiopropionate); and phosphorus compound antioxidants such as tris(nonylphenyl) phosphite and tris(2,4-di-t-butylphenyl) phosphite.

When a phosphorus compound antioxidant is further added in the second step in the production process of the invention, a better surface appearance can be imparted to molded articles, in particular, large molded articles. Especially in the case of large molded articles obtained by injection molding, e.g., the housings of 21-inch and larger TV receivers, exterior parts for facsimile telegraphs, exterior parts for computer monitors, and exterior parts for printers, there have been the following problems. Since such molded articles are large, it is necessary in injection molding to inject a resin into a mold in a moment at a high ejection pressure and, as a result, the front part (so-called flow front) of the molten resin deforms and heats up due to shearing. The resin temperature thus increases to about 350° C. Because of this, the molded article obtained tends to have a surface appearance failure called black streaks on the surface thereof. In the case where such black streaks have generated, this molded article often has silver streaks also. Poor surface appearances are undesirable because coating this molded article gives a coating film which peels off. For inhibiting such a phenomenon, it is preferred to add a phosphorus compound antioxidant. Examples of the phosphorus compound antioxidant include pentaerythritol type diphosphite derivatives besides the aforementioned ones such as tris(nonylphenyl) phosphite, derivatives thereof, tris(2,4-di-t-butylphenyl) phosphite, and derivatives thereof. Especially preferred is bis(2,6-di-t-butyl-4-methylphenyl)pentaerythritol diphosphite.

There also are cases where a zinc compound such as zinc oxide or zinc sulfide is used as a heat stabilizer in the modified PPE.

Examples of the ultraviolet absorber and light stabilizer include benzotriazole compound ultraviolet absorbers such as 2-(2'-hydroxy-5'- methylphenyl)benzotriazole, 2-(2'-hydroxy-3',5'-di-t-butylphenyl)benzotriazole, and 2-(2'-hydroxy-3',5'-di-t -butylphenyl)-5-chlorobenzotriazole, benzophenone compound ultraviolet absorbers such as 2-hydroxy-4-methoxybenzophenone, and hindered amine light stabilizers.

A pigment such as red iron oxide or titanium dioxide, a wax such as a paraffin wax, microcrystalline wax, or low-molecular polyethylene wax, or a polyolefin thermoplastic resin such as an amorphous polyolefin or ethylene/ethyl acrylate copolymer or a low-molecular vinylaromatic thermoplastic resin may be added, besides the stabilizers, to the composition of the invention according to need or as long as the addition thereof does not adversely influence the properties of the composition.

To the resin composition of the invention may be added heavy calcium carbonate, colloidal calcium carbonate, soft calcium carbonate, silica, kaolin, clay, titanium oxide, barium sulfate, zinc oxide, alumina, magnesium hydroxide, talc, mica, glass flakes, hydrotalcite, acicular fillers (wollastonite, potassium titanate, basic magnesium sulfate, seplite, xonotlite, and aluminum borate), glass beads, silica beads, alumina beads, carbon beads, glass balloons, metallic conductive fillers, nonmetallic conductive fillers, carbon, magnetic fillers, piezoelectric/pyroelectric fillers, sliding fillers, fillers for sealing, ultraviolet-absorbing fillers, vibration-damping fillers, conductive fillers (Ketjen Black and acetylene black), and the like. Fibers such as glass fibers, carbon fibers, and metal fibers can be further added. Thus, composites can be obtained according to applications.

Furthermore, flame retardancy can be further improved by adding various flame retardants and flame retardant aids which have been known, such as, for example, halogen compounds, hydroxides, e.g., magnesium hydroxide and aluminum hydroxide, zinc borate compounds, zinc stannate compounds, antimony trioxide, inorganic silicon compounds such as silica and silica-alumina, tetrafluoroethylene polymers, and silicone compounds.

It is preferred that these additives be added in the second step for the purpose of inhibiting the deterioration caused by shearing and heat during extrusion processing. In particular, it is preferred that a fibrous inorganic reinforcement be supplied in the second step through an internal part of the extruder cylinder so as to inhibit the fibers from breaking.

EXAMPLES

The invention will be explained below by reference to Examples.

Production Example 1

Production of Partially Hydrogenated Polybutadiene

A partially hydrogenated polybutadiene in which 5-70% of all double bonds had been hydrogenated and which was to be used for producing a rubber-modified polystyrene containing the partially hydrogenated polybutadiene was produced by the following method.

An autoclave having a capacity of 10 L and equipped with a stirrer and a jacket was used as a reactor. A butadiene/n-hexane liquid mixture (butadiene concentration, 20% by weight) and an n-butyllithium/n-hexane solution (concentration, 5% by weight) were introduced into the reactor at rates of 20 L/hr and 70 mL/hr, respectively, to continuously polymerize butadiene at a polymerization temperature of 110° C. The active polymer obtained was deactivated with methanol. The resultant polymer solution was transferred in an amount of 8 L to another reactor having a capacity of 10 L and equipped with a stirrer and a jacket. At a temperature of 60° C., a hydrogenation catalyst prepared by mixing 250 mL of a di-p-tolyl-bis(1-cyclopentadienyl)titanium/cyclohexane solution (concentration, 1.2 mmol/L) with 50 mL of an n-butyllithium solution (concentration, 6 mmol/L) at 0° C. and a hydrogen pressure of 0.2 MPa was added thereto and the contents were reacted at a partial hydrogen pressure of 0.3 MPa for 60 minutes. To the resultant solution of a partially hydrogenated polymer was added 2,6-di-t-butylhydroxytoluene as an antioxidant in an amount of 0.5 parts by weight per 100 parts by weight of the polymer. The solvent was removed. After methanol deactivation, the partially hydrogenated polybutadiene was sampled. Found values obtained by analyzing this polymer are as shown in Table 1.

TABLE 1

| | Microstructure before hydrogenation (*2) | | Degree of |
|---|---|---|---|
| Solution viscosity (*1) (cP) | 1,2-Vinyl bond (wt %) | 1,4-Bond (wt %) | hydrogenation (*3) (%) |
| 70 | 15 | 70 | 30 |

(*1) Solution viscosity was determined by examining the 5% by weight styrene solution at 25° C. with a Cannon-Fenske viscometer.
(*2) The amount of vinyl bonds was determined through examination by infrared analysis (IR) and calculation by the Hampton method.
(*3) The degree of hydrogenation was determined with a nuclear magnetic resonance apparatus (NMR).

Production Example 2

Production of Rubber-Modified Polystyrene Containing

Partially Hydrogenated Polybutadiene

The partially hydrogenated polybutadiene obtained in Production Example 1 was dissolved in the following liquid mixture to obtain a homogeneous solution.
Polybutadiene, 8.8% by weight
Styrene, 78.5% by weight
Ethylbenzene, 14.0% by weight
α-Methylstyrene dimer, 0.12% by weight
t-Butyl peroxyisopropyl carbonate, 0.03% by weight Subsequently, the liquid mixture was continuously sent to a reactor comprising serially-arranged four stages equipped with a stirrer. Polymerization was conducted under the conditions of a stirring speed of 190 rpm and 126° C. in the first stage, 50 rpm and 133° C. in the second stage, 20 rpm and 140° C. in the third stage, and 20 rpm and 155° C. in the fourth stage. The liquid resulting from this polymerization, which had a solid content of 73% by weight, was subsequently introduced into a volatilizing apparatus to remove the monomers remaining unreacted and the solvent. Thus, a rubber-modified aromatic vinyl resin was obtained. The rubber-modified aromatic vinyl resin obtained was analyzed. As a result, it was found that the resin had a rubber content of about 12% by weight and the rubber had a volume-average particle diameter of about 1.5 μm. The matrix polystyrene had a reduced viscosity $\eta_{sp}/c$ of 0.68 dL/g (30° C.; 0.5 g/100 mL toluene solution).

In the Examples and Comparative Examples, the following raw materials were used unless otherwise indicated.

Poly(phenylene ether) (PPE-1) as ingredient (A1): Use was made of a powder of poly(2,6-dimethyl-1,4-phenylene ether) having an intrinsic viscosity of 0.48.

Poly(phenylene ether) (PPE-2) as ingredient (A2): Use was made of a powder of poly(2,6-dimethyl-1,4-phenylene ether) having an intrinsic viscosity of 0.38.

Rubber-modified polystyrene containing partially hydrogenated polybutadiene (HIPS-1) as ingredient (B1): The polystyrene modified with a partially hydrogenated polybutadiene obtained in Production Example 2 was used.

Rubber-modified polystyrene containing polybutadiene having 90% or higher cis-1,4 bonds (HIPS-2) as ingredient (B2): Use was made of a rubber-modified polystyrene containing about 12% by weight polybutadiene having about 98% cis-1,4 bonds. This modified polystyrene was produced in accordance with the production of a rubber-modified polystyrene in Production Example 2. In this modified polystyrene, the dispersed rubber had a volume-average particle diameter of about 1.5 μm and the matrix polystyrene had a reduced viscosity $\eta_{sp}/c$ of 0.70 dL/g (30° C.; 0.5 g/100 mL toluene solution).

As a rubber-unmodified styrene homopolymer (GPPS) was used Polystyrene 685 (trade name), manufactured by PS Japan Co., Ltd.

Phosphoric ester flame retardant (BDP) as ingredient (C): Use was made of CR741, manufactured by Daihachi Chemical Industry Co., Ltd.

Phosphazene compound (PZ) as ingredient (C): Use was made of SPS-100, manufactured by Ohtsuka Chemical Industrial Co., Ltd.

Flame retardant aid (PTFE-MB) as ingredient (D): A mixture with an acrylate polymer which contained 25% by weight PTFE. Use was made of Metablen A3000 (trade name), manufactured by Mitsubishi Rayon Co., Ltd.

The following were used as other ingredients. Hydrogenated block copolymer 1 (HTR-1): A hydrogenated block copolymer which was a product of the hydrogenation of a styrene/butadiene/styrene block copolymer and in which the amount of combined styrene for both blocks was 30% by weight, the overall degree of hydrogenation of the unsaturated double bonds derived from butadiene was 95% or higher, and the number-average molecular weight of the copolymer was about 80,000.

Hydrogenated block copolymer 2 (HTR-2): A hydrogenated block copolymer which was a product of the hydrogenation of a styrene/butadiene/styrene block copolymer and in which the amount of combined styrene for both blocks was 17.5% by weight, the overall degree of hydrogenation of the unsaturated double bonds derived from butadiene was 95% or higher, and the number-average molecular weight of the copolymer was about 150,000. It contained 35% by weight paraffinic process oil. Hydrogenated block copolymer 3 (HTR-3): A hydrogenated block copolymer which was a product of the hydrogenation of a styrene/butadiene/styrene block copolymer and in which the amount of combined styrene for both blocks was 15% by weight, the overall degree of hydrogenation of the unsaturated double bonds derived from butadiene was about 75%, and the number-average molecular weight of the copolymer was about 70,000.

Polyolefin polymer 1 (PE): Low-density polyethylene (PE) having an MFR of 0.5 g/10 min (ASTM D1238; 190° C.; 2.16 kg).

Polyolefin polymer 2 (EP): Tafmer P-0680, manufactured by Mitsui Chemicals, Inc., as an ethylene/propylene copolymer (EP).

Polyolefin polymer 3 (EEA): EVAFLEX-EEA A-703, manufactured by Du Pont-Mitsui Polychemicals Co., Ltd., as an ethylene/ethyl acrylate copolymer.

Properties of the resin compositions obtained in the Examples and Comparative Examples were evaluated by the following test methods.

1) Unmelted Matter: A flat plate obtained by compression molding at 250° C. and having dimensions of about 300×300 mm and a thickness of 1 mm was subjected to vacuum forming to produce a film having a thickness of about 0.05 mm.

An area having a size of 100 mm×100 mm in the film produced was visually examined to judge the amount of the unmelted matter derived from the poly(phenylene ether) powder and observed as particles in that area. The cases where the number of such particles observed was 10 or less, 10-50, and larger than 50 are indicated by A, B, and C, respectively.

2) Black Foreign Particles: A flat plate having dimensions of 160×160 mm and a thickness of 1 mm obtained by compression molding at 250° C. with a press mold was examined to count the number of black particles observed in the surface of the flat plate. One particle of 100 µm or larger counted for one point. The cases where the total point was 50 or smaller, exceeded 50, and exceeded 100 are indicated by A, B, and C, respectively.

3) Rubber Tg: A melt indexer in accordance with ASTM D1238 was used to produce a cylindrical test piece through extrusion at 250° C. under a load of 10 kg. This test piece was examined for dynamic viscoelastic behavior with tensile vibrations using RHEOVIBRON Type DDV=25FP, manufactured by Orientec Co., Ltd., under the conditions of a tensile load of 100 gf (about 1 N), vibration frequency of 35 Hz, and heating rate of 2° C./min. The temperature corresponding to the peak of loss modulus thus obtained was taken as the glass transition point Tg (° C.).

4) Izod Impact Strength: A test piece having a thickness of about 3.2 mm obtained by injection molding was examined in a notched form in accordance with ASTM D256 at 23° C. and −30° C.

5) Molding Stability: The stability was expressed in terms of the proportion of the −30° C. Izod impact strength of a test piece molded at a maximum set heating-cylinder temperature of 320° C. using an injection-molding machine having a clamping pressure of 80 tons to the −30° C. Izod impact strength of a test piece molded at a maximum set heating-cylinder temperature of 290° C. (retention of Izod impact strength (%)). The molding cycle time was about 60 seconds for each cycle. With respect to each resin composition obtained which had a poly(phenylene ether) content lower than 35% by weight, molding is conducted at a maximum set heating-cylinder temperature of 220° C. using an injection-molding machine having a clamping pressure of 80 tons as in the above operation.

6) Heat Exposure Resistance: The resistance was expressed in terms of the proportion of the −30° C. Izod impact strength of a test piece which had been molded at a maximum set heating-cylinder temperature of 290° C. using an injection-molding machine having a clamping pressure of 80 tons and had undergone 500-hour exposure to 120° C. air to the −30° C. Izod impact strength of the test piece which had not undergone the exposure (retention of Izod impact strength (%)). The test piece having a thickness of about 3.2 mm obtained by injection molding was notched before the exposure to heat. With respect to each resin composition obtained which had a poly(phenylene ether) content lower than 35% by weight, molding is conducted at a maximum set heating-cylinder temperature of 220° C. using an injection-molding machine having a clamping pressure of 80 tons as in the above operation.

7) Chemical Resistance: A test piece having a thickness of about 3.2 mm obtained by injection molding was examined for tensile strength (TSa) in accordance with ASTM D638. On the other hand, the test piece was attached to a bar having such an arc shape that the test piece surface came to have a strain of 1%. This test piece in the attached state was immersed for 30 minutes in a liquid mixture of isopropyl alcohol and cyclohexane in a ratio of 60/40 by weight at 23° C. Thereafter, the test piece was examined for tensile strength (TSb) in the same manner. The resistance is expressed in terms of the proportion of TSb to TSa (retention of tensile strength) (%).

8) Surface Appearance and Coatability:

With respect to each final resin composition having a poly(phenylene ether) content of 38% by weight or higher, a platy molded article having dimensions of 15 cm×15 cm×2 mm (thickness) is molded at a resin temperature of 320° C. using a molding machine having a clamping pressure of 80 t. The gate used in this molding is a 1-mmϕ pin gate of the cold-runner type extending from the center of a 15-cm side of the molded article. With respect to each resin composition having a poly(phenylene ether) content lower than 35% by weight, a five-face molded article having height-length-width dimensions of 72×135×10.2 cm (large molded article) is obtained with an injection-molding machine having a clamping pressure of 1,500 t. The cylinder temperature in this molding is set at 280° C. A gate for injection molding is disposed at the center of the edge of each of the four side faces and at the center of the top face. The gate parts of the mold are of the hot runner type, and the temperature thereof is set at 285° C. The thicknesses of the molded article after cooling are such that the thickness of the four side faces is 1.5 mm and the thickness of the top face is 2 mm. The cavity has a taper of 2°. The appearances of the platy molded article and large molded article thus obtained were visually examined. In evaluating the coatability of the molded articles, Mr. Color Spray No. J8 (gray), manufactured by GSI Creos Corp., was applied and dried and the finish was examined.

The surface appearance of the platy molded article is evaluated based on a comprehensive judgment on black streaks, silver streaks, and flow marks, and expressed as AA (good) >A>B>C (poor). Large molded articles considerably develop-black streaks, silver streaks, and flow marks. The large molded article was hence evaluated for each of black streaks, silver streaks, and flow marks, and each item was expressed as AA (good)>A>B>C (poor). The visual examination of the coatability of each of the platy molded article and the large molded article was comprehensively made with respect to coating unevenness and coating film peeling, and the coatability is expressed as AA (good)>A>B>C (poor).

9) Drop Test of Large Molded Article (Practical Impact Test) and Molding Warpage Evaluation A test for examining the practical impact strength of a large molded article was conducted in the following manner. The five-face molded article described under 8) was lifted up to such a height that the distance between a corner thereof and the concrete surface (ground surface) became 1.5 m. This molded article was caused to fall free to examine four corner sides. The molded articles which broke in this test are indicated by C, and those which suffered no breakage at all are indicated by A.

The warpage of a large molded article is evaluated by molding the molded article, subsequently allowing the molded article to stand for 24 hours in a 25° C. thermostatic chamber having a humidity of 50%, placing the molded article on a steel platen, with the top face faced upward, and examining the degree of warpage of the central part thereof.

The molded articles in which no warpage was observed at all are indicated by A, and those in which a corner part warped in an amount of 3 mm or more from the platen are indicted by C.

10) Deflection Temperature under Load: A test piece having a thickness of 6.4 mm was examined in accordance with ASTM D648 under the conditions of 1.82 MPa.

11) Flame Retardancy: A test piece having a thickness of 1.6 mm was subjected to a vertical flame test in accordance with UL-94 to evaluate flame retardancy.

Example 1

In Example 1, twin-screw corotating extruder ZSK-40MC (screw diameter, 40 mm; number of barrels, 11; L/D, about 47), manufactured by Welner Inc., was used as an extruder for the first step. The barrel constitution of this extruder was as follows. No. 1 had a first raw-material feed opening, and No. 6 and No. 10 had a vent hole. A flame retardant injection opening had been disposed between No. 6 and No. 7 and between No. 10 and No. 11, and No. 7 and No. 8 had a side feed opening. The barrel temperatures in the respective zones were as follows: barrel No. 1 was water-cooled, and the temperatures of preceding stages (barrels Nos. 2-6) and the subsequent stages (barrels Nos. 7-11) were regulated to 290° C. and 270° C., respectively.

Nitrogen was supplied to the raw-material feed opening and the feeder hopper to regulate the raw-material feed line so as to have an oxygen concentration of 2 wt % or lower. For feeding each raw material to the extruder, a gravimetric feeder was used.

A 100-mesh screen was attached to the breaker plate of the die. Evacuation through the first vent hole was conducted at about 900 hPa, and the second vent hole was closed. Kneading/extrusion was conducted at a screw rotation speed of 600 rpm and a rate of 150 kg/hr to produce pellets CR-1 as a product of the first step in Example 1 as shown in Table 2. The temperature of the molten resin as measured at the die outlet was about 350° C. In this operation, 0.2 parts by weight of zinc oxide and 0.2 parts by weight of tris(2,4-di-t-butylphenyl) phosphite (manufactured by Ciba Specialty Chemicals Co.; trade name, Irgafos 168) were added as stabilizers. In the second step, the pellets CR-1 and HIPS-2 (B2) were mixed, according to the formulation shown in Table 2, with 1 part by weight of a hydrogenated styrene/butadiene/styrene block copolymer (HTR-1), 1 part by weight of low-density polyethylene (PE) as a polyolefin polymer, and 0.2 parts by weight of bis(2,6-di-t-butyl-4-methylphenyl)pentaerythritol diphosphite (manufactured by Asahi Denka Kogyo K.K.; trade name, Adeka Stab PEP-36). Using a single-screw extruder having a screw diameter of 50 mm (vented extruder having a three-stage Dulmage torpedo), the mixture was kneaded/extruded at a maximum set cylinder temperature of 290° C. The die plate had a 100-mesh screen attached thereto. This kneading/extrusion was conducted at a screw rotation speed of 300 rpm and a rate of 100 kg/hr with evacuation through the vent hole at about 900 hPa. Thus, resin composition pellets were obtained. The temperature of the molten resin as measured at the die outlet was about 300° C.

Izod impact strength was measured by examining a test piece molded with an injection-molding machine having a clamping pressure of 80 tons at a maximum set heating-cylinder temperature of 290° C. Other properties were determined by the evaluation methods described above. The results shown in Table 2 were obtained.

Examples 2 and 3

Pellets CR-2 and pellets CR-3 were obtained under the same extrusion conditions as in the first step in Example 1, except that liquid phosphoric ester flame retardant BDP was further fed portion-wise in such a manner that a half thereof was introduced through the first injection opening and the remaining half was introduced through the second injection opening. In the second step, the compositions shown under Example 2 and Example 3 in Table 2 were produced by conducting the same operation as in Example 1. Properties of the compositions were evaluated in the same manners as in Example 1. The results shown in Table 2 were obtained.

Example 4

CR-2, which was obtained in the first step in Example 2, and CR-3, which was obtained in the first step in Example 3, were mixed together in a ratio of 40/60 by weight. The composition shown under Example 4 in Table 2 was produced by conducting the same operation as in the second step in Example 1. Properties of the composition were evaluated in the same manners as in Example 1. The results shown in Table 2 were obtained.

Comparative Example 1

The same extruder as in the first step in Example 1 was used. The same ingredients as in Example 1 were fed en bloc in the same proportions as in Example 1 through the first feed opening to produce a resin composition in one stage. The kneading/extrusion was conducted under the same extrusion conditions as in Example 1 with respect to the set temperature, screen, screw rotation speed, and extrusion rate to obtain resin composition pellets. Properties of the composition were evaluated in the same manners as in Example 1. The results shown in Table 2 were obtained.

Comparative Example 2

The same operation as in Example 2 was conducted, except that the rubber-modified polystyrene containing a partially hydrogenated polybutadiene (HIPS-1) used in Example 2 was wholly replaced by a rubber-modified polystyrene containing a polybutadiene having 90% or higher cis-1,4 bonds (HIPS-2). The results shown in Table 2 were obtained.

Comparative Example 3

The same extruder as in the first step in Example 1 was used. The same resin ingredients as in Example 2 were fed en bloc in the same proportions as in Example 2 through the first feed opening. Furthermore, liquid phosphoric ester flame retardant BDP was fed portion-wise in such a manner that a half thereof was introduced through the first injection opening and the remaining half was introduced through the second injection opening. Thus, a resin composition was produced in one stage. The kneading/extrusion was conducted under the same extrusion conditions as in Example 1 with respect to the set temperature, screen, screw rotation speed, and extrusion rate to obtain resin composition pellets.

Properties of the composition, surface appearance, and coatability were evaluated in the same manners as in Example 1. The results shown in Table 2 were obtained.

Examples 5, 6, and 7

The same extruder as in the first step in Example 1 was used. Resin ingredients PPE-1, HIPS-1, and GPPS were fed through the first feed opening and HIPS-2 was fed through the second feed opening to produce the resin compositions shown in Table 3, which had the same makeup as in Example 1, in one stage. The kneading/extrusion was conducted under the same extrusion conditions as in Example 1 with respect to the set temperature, screen, screw rotation speed, and extrusion rate to obtain resin composition pellets. HTR and PE were fed through the first feed opening in Examples 5 and 7 and through the second feed opening in Example 6. Properties of the compositions, surface appearance, and coatability were evaluated in the same manners as in Example 1. The results shown in Table 3 were obtained.

Examples 8 to 11

Using the same extrude as in the first step in Example 1, resin pellets CR-4 and CR-5 which had the compositions shown in Table 4 were produced as products of the first step. The extrusion was conducted under the same conditions as in Example 1 with respect to the set temperature, screen, screw rotation speed, and extrusion rate. In the second step, twin-screw corotating extruder ZSK-40 (screw diameter, 40 mm; number of barrels, 9; L/D, about 37), manufactured by Welner Inc., was used to conduct kneading/extrusion at a maximum set cylinder temperature of 290° C. The die plate had a 100-mesh screen attached thereto. This kneading/extrusion was conducted at a screw rotation speed of 250 rpm and a rate of 100 kg/hr with evacuation through the vent hole at about 900 hPa. In the second step, the pellets CR-4 or CR-5 were used and mixed with other ingredients according to each of the formulations shown in Table 4, and the resultant mixture was fed to the extruder. In Example 6, however, phosphoric ester flame retardant BDP was injected through an internal part of the barrel.

The compositions obtained were molded in the same manners as in Example 1 and evaluated for properties under the same evaluation conditions as described above. The results shown in Table 4 were obtained.

Examples 12 to 16

According to the formulations shown in Table 5, resin compositions were obtained under the same extrusion conditions as in Example 2. Properties of the compositions, surface appearance, and coatability were evaluated in the same manners. The results shown in Table 5 were obtained.

TABLE 2

| | | | Production method | | | | | | |
|---|---|---|---|---|---|---|---|---|---|
| | | | Two-stage-method (two-step) extrusion | | | | One-stage method/ en-block-feed extrusion | | |
| | Ingredient | Feed position | Ex. 1 CR-1 | Ex. 2 CR-2 | Ex. 3 CR-3 | Ex. 4 CR-2/CR-3 | Comp. Ex. 1 | Comp. Ex. 2 | Comp. Ex. 3 |
| First step formulation (parts by weight) | PPE-1 (A1) | F1 | 40 | 60 | 38 | (47) | 40 | 60 | 38 |
| | HIPS-1 (B1) | F1 & F2 | 15 | 15 | 10 | (12) | 15 | | |
| | HIPS-2 | F1 | | | | | 40 | 30 | 42 |
| | GPPS (B1) | F1 | 5 | | 5 | (3) | 5 | 10 | 5 |
| | BDP (C) | L1 & L2 | | 10 | 15 | (13) | | 10 | 15 |
| | HTR-1 | | | | | | 1 | 1.5 | 1.5 |
| | PE | | | | | | 1 | 2 | 2 |
| | PEP-36 | | | | | | 0.2 | 0.2 | |
| | Ingredient ratio by weight | A/B1 (A + B1)/C | 67/33 — | 80/20 100/13.3 | 73/27 100/28.3 | | | | |
| Second step formulation (parts by weight) | HIPS-2(B2) | | 40 | 15 | 32 | 25 | | | |
| | GPPS (B2) | | | | | | | | |
| | PTFE-MB (D) | | | | 1 | | | | |
| | HTR-1 | | 1 | 1.5 | 1.5 | 1.5 | | | |
| | PE | | 1 | 2 | 1.5 | 1.5 | | | |
| | PEP-36 | | 0.2 | 0.2 | 0 | 0 | | | |
| | Item | Unit | | | | | | | |
| Composition properties | Unmelted matter | — | A | A | A | A | B | A | B |
| | Black foreign particle | — | A | A | A | A | A | B | B |
| | Rubber Tg | °C. | −95 | −95 | — | — | −83 | −78 | −85 |
| strength | | | | | | | | | |
| | 23° C. | J/m | 205 | 150 | 148 | 144 | 175 | 128 | 130 |
| | −30° C. | J/m | 115 | 85 | 80 | 82 | 92 | 65 | 65 |

TABLE 2-continued

|  |  |  |  |  |  |  |  |  |
|---|---|---|---|---|---|---|---|---|
| Molding stability | % | 66 | 65 | — | — | 36 | 35 | 38 |
| Heat exposure resistance | % | 50 | 48 | — | — | 27 | 26 | — |
| Chemical resistance | % | 88 | — | — | — | 66 | — | — |
| Surface appearance | visual exam. | AA | AA | A | A | B | B | C |
| Coatability | visual exam. | AA | AA | A | A | B | B | C |

TABLE 3

| | | | Production method One-stage method/portion-wise-feed extrusion | | |
|---|---|---|---|---|---|
| | Ingredient | Feed position | Ex. 5 | Ex. 6 | Ex. 7 |
| Formulation (parts by weight) | PPE-1 (A1) | F1 | 40 | 40 | 40 |
| | HIPS-1 (B1) | F1 & F2 | 15 | 15 | 15 |
| | HTR-1 | F1 | | 1 | |
| | PE | F1 | | 1 | |
| | GPPS (B1) | F1 | 5 | 5 | 5 |
| | HIPS-2(B2) | F2 | 40 | 40 | 40 |
| | HTR-1 | F2 | 1 | | 1 |
| | PE | F2 | 1 | | 1 |
| | PEP-36 | F2 | 0 | 0 | 0.2 |
| | Item | Unit | | | |
| Composition properties | Unmelted matter | | A | A | A |
| | Black foreign particle | | A | A | A |
| | Rubber Tg | ° C. | −92 | −92 | −93 |
| | Izod impact strength | | | | |
| | 23° C. | J/m | 195 | 170 | 201 |
| | −30° C. | J/m | 105 | 95 | 110 |
| | Molding stability | % | 60 | 55 | 65 |
| | Heat exposure resistance | % | 45 | 40 | 50 |
| | Chemical resistance | % | 88 | 80 | 92 |
| | Surface appearance | visual judgment | A | A | AA |
| | Coatability | visual judgment | A | A | AA |

TABLE 4

| | | | Production method Two-stage-method (two-step) extrusion | | | |
|---|---|---|---|---|---|---|
| | Ingredient | Feed position | Ex. 8 CR-5 | Ex. 9 CR-5 | Ex. 10 CR-5 | Ex. 11 CR-5 |
| First step formulation (parts by weight) | PPE-1 (A1) | F1 | 60 | 60 | 60 | 60 |
| | HIPS-1 (B1) | F1 & F2 | 15 | 15 | 15 | 15 |
| | GPPS (B1) | F1 | 10 | 10 | 10 | 10 |
| | BDP (C) | L2 | | | | |
| | Ingredient ratio by weight | A/B1 | 71/29 | 71/29 | 71/29 | 71/29 |
| Second step formulation (parts by weight) | HIPS-2(B2) | | 15 | 15 | 15 | 15 |
| | BDP (C2) | (internal addition) | 13 | | 13 | |
| | PZ (C2) | | | 13 | | 13 |
| | HTR-1 | | 1 | 1 | 1 | 1 |
| | PE | | 1 | 1 | 1 | 1 |
| | PEP-36 | | 0 | 0 | 0.2 | 0.2 |
| | Item | Unit | | | | |
| Composition properties | Unmelted matter | — | A | A | A | A |
| | Black foreign particle | — | A | A | A | A |
| | Izod impact strength | | | | | |
| | 23° C. | J/m | 130 | 140 | 138 | 143 |
| | −30° C. | J/m | 72 | 80 | 85 | 92 |
| | Molding stability | % | 62 | 68 | 67 | 70 |

TABLE 4-continued

| | | | | | |
|---|---|---|---|---|---|
| Heat exposure resistance | % | 45 | 52 | 50 | 57 |
| Deflection temp. under load | °C. | 112 | 117 | 112 | 117 |
| Flame retardancy | — | V-1 | V-0 | V-1 | V-0 |
| Surface appearance | visual evaluation | A | A | AA | AA |
| Coatability | visual evaluation | A | A | AA | AA |

TABLE 5

| | | | Production method Two-stage-method (two-step) extrusion | | | | |
|---|---|---|---|---|---|---|---|
| | Ingredient | Feed position | Ex. 12 CR-2 | Ex. 13 CR-2 | Ex. 14 CR-2 | Ex. 15 CR-2 | Ex. 16 CR-2 |
| First step formulation (parts by weight) | PPE-1 (A1) | F1 | 65 | 65 | 65 | 65 | 65 |
| | HIPS-1 (B1) | F1 | 7 | 7 | 7 | 7 | 7 |
| | GPPS (B1) | F1 | 3 | 3 | 3 | 3 | 3 |
| | BDP (C) | L1 & L2 | 10 | 10 | 10 | 10 | 10 |
| | Ingredient ratio by weight | A/B1 (A+B1)/C | 87/13 100/13.3 | | 87/13 100/13.3 | 87/13 100/13.3 | 87/13 100/13.3 |
| Second step formulation (parts by weight) | HIPS-2(B2) | | 11 | 11 | 11 | 11 | 8 |
| | HTR-1 | | 1.5 | 1.5 | | | |
| | HTR-2 | | | | 1.5 | | |
| | HTR-3 | | | | | 3 | 6 |
| | EP | | | | 2.5 | 1 | 1 |
| | EEA | | 2.5 | 2.5 | | | |
| | PEP-36 | | 0 | 0.2 | 0 | 0 | 0 |
| | Item | Unit | | | | | |
| Composition properties | Unmelted matter | — | A | A | A | A | A |
| | Black foreign particle | — | A | A | A | A | A |
| | Izod impact strength | | | | | | |
| | 23° C. | J/m | 115 | 120 | 125 | 110 | 120 |
| | −30° C. | J/m | 60 | 65 | 65 | 66 | 68 |
| | Molding stability | % | 65 | 70 | 67 | 68 | 67 |
| | Heat exposure resistance | % | 45 | 50 | 47 | 45 | 45 |
| | Chemical resistance | % | 75 | 75 | 76 | 83 | 87 |
| | Surface appearance | visual exam. | A | AA | A | A | A |
| | Coatability | visual exam. | A | AA | A | A | A |

Examples 17 and 18

In Examples 17 and 18, twin-screw corotating extruder ZSK-40MC (screw diameter, 40 mm; number of barrels, 11; L/D, about 47), manufactured by Welner Inc., was used as an extruder for the first step. The barrel constitution of this extruder was as follows. No. 1 had a first raw-material feed opening, and No. 6 and No. 10 had a vent hole. A flame retardant injection opening had been disposed between No. 6 and No. 7 and between No. 10 and No. 11, and No. 7 and No. 8 had a side feed opening. The barrel temperatures in the respective zones were as follows: barrel No. 1 was water-cooled, and the temperatures of preceding stages (barrels Nos. 2-6) and the subsequent stages (barrels Nos. 7-11) were regulated to 290° C. and 270° C., respectively.

Nitrogen was supplied to the raw-material feed opening and the feeder hopper to regulate the raw-material feed line so as to have an oxygen concentration of 2 wt % or lower. For feeding each raw material to the extruder, a gravimetric feeder was used.

A 100-mesh screen was attached to the breaker plate of the die. Evacuation through the first vent hole was conducted at about 900 hPa, and the second vent hole was closed. Kneading/extrusion was conducted at a screw rotation speed of 600 rpm and a rate of 150 kg/hr to produce the pellets CR-1 as a product of the first step in Example 1 as shown in Table 2. The temperature of the molten resin as measured at the die outlet was about 350° C. In this operation, 0.2 parts by weight of zinc oxide and tris(2,4-di-t-butylphenyl) phosphite (manufactured by Ciba Specialty Chemicals Co.; trade name, Irgafos 168) were added as stabilizers.

In the second step, the pellets CR-1 and HIPS-2 (B2) were mixed, according to the formulation shown in Table 6, with 1 part by weight of a hydrogenated styrene/butadiene/styrene block copolymer (HTR-1) and 1 part by weight of low-density polyethylene (PE) as a polyolefin polymer. In Example 18, 0.2 parts by weight of bis(2,6-di-t-butyl-4-methylphenyl) pentaerythritol diphosphite (manufactured by Asahi Denka Kogyo K.K.; trade name, Adeka Stab PEP-36) was further added. Using a single-screw extruder having a screw diameter of 50 mm (vented extruder having a three-stage Dulmage torpedo), each mixture was kneaded/extruded at a maximum set cylinder temperature of 290° C. The die plate had a 100-mesh screen attached thereto. This kneading/extrusion was conducted at a screw rotation speed of 300 rpm and a rate of 100 kg/hr with evacuation through the vent hole at about 900 hPa. Thus, resin composition pellets were obtained. The temperature of the molten resin as measured at the die outlet was about 300° C. The Izod impact strength of each composition was measured by examining a test piece molded with an injection-molding machine having a clamping pressure of 80 tons at a maximum set heating-cylinder temperature of 220° C. Properties of housings were evaluated with respect to surface appearance, coatability, and drop test by the evaluation methods described above. The results shown in Table 6 were obtained.

Comparative Example 4

The same ingredients as in Example 17 were fed en bloc in the same proportions as in Example 17 through the first feed opening to produce a resin composition in one stage. The kneading/extrusion was conducted under the same extrusion conditions as in Example 17 with respect to the set temperature, screen, screw rotation speed, and extrusion rate to obtain resin composition pellets. Properties of the composition and properties of a housing were evaluated in the same manners as in Example 17. The results shown in Table 6 were obtained.

Comparative Example 5

The same ingredients as in Example 18 were fed en bloc in the same proportions as in Example 18 through the first feed opening to produce a resin composition in one stage. The kneading/extrusion was conducted under the same extrusion conditions as in Example 17 with respect to the set temperature, screen, screw rotation speed, and extrusion rate to obtain resin composition pellets. Properties of the composition and properties of a housing were evaluated in the same manners as in Example 17. The results shown in Table 6 were obtained.

TABLE 6

| | Ingredient | Feed position | One-stage method/ portion wise-feed extrusion | | | One-stage method/ en-block-feed extrusion | |
|---|---|---|---|---|---|---|---|
| | | | Ex. 17 CR-1 | Ex. 18 CR-1 | Ex. 19 CR-1 | Comp. Ex. 4 | Comp. Ex. 5 |
| Formulation (parts by weight) | PPE-2 (A2) | F1 | 21 | 21 | 21 | 21 | 21 |
| | HIPS-1 (B1) | F1 | 5 | 5 | 5 | 5 | 5 |
| | HIPS-2 | F1 | | | | 54 | 54 |
| | HTR-1 | F1 | | | | 1 | 1 |
| | PE | F1 | | | | 1 | 1 |
| | BDP (C) | L2 | 11 | 11 | 11 | 11 | 11 |
| | PEP-36 | F1 | 0 | 0.2 | 0 | 0 | 0.2 |
| | HIPS-2 (B2) | F2 | 54 | 54 | 54 | | |
| | HTR-1 | F2 | 1 | 1 | 1 | | |
| | PE | F2 | 1 | 1 | 1 | | |
| | PEP-36 | F2 | 0 | 0 | 0.2 | | |
| | Item | Unit | | | | | |
| Composition properties | Unmelted matter | | A | A | A | C | C |
| | Black foreign particle | | A | A | A | B | A |
| | Izod impact strength | | | | | | |
| | 23° C. | J/m | 70 | 70 | 75 | 60 | 65 |
| | −30° C. | J/m | 40 | 40 | 45 | 30 | 35 |
| | Surface appearance | Visual judgment | | | | | |
| Housing properties | Black streak | | A | A | AA | C | C |
| | Silver streak | | A | A | AA | C | B |
| | Flow mark | | AA | AA | AA | B | B |
| | Coatability | visual judgment | A | A | AA | C | B |
| | Drop test | breakage on 1.5 m falling | A | A | AA | C | C |
| | Warpage evaluation | | A | A | A | C | C |

INDUSTRIAL APPLICABILITY

The production process of the invention can be used for the commercial production of a modified poly(phenylene ether) resin. The modified poly(phenylene ether) resin obtained by the process can be processed into practical articles by processing techniques comprising a combination of two or more of injection molding, extrusion molding, sheet/film formation, foam molding, and other molding techniques. Such molded articles can be extensively utilized as various electrical/electronic members, various automotive members, various business machine members, industrial members for dwelling houses/various pipings/wirings, and the like, members for optical apparatus, various outdoor members, etc.

The invention claimed is:

1. A process for producing a poly(phenylene ether) resin composition comprising (A) a poly(phenylene ether) and (B) a styrene resin, the styrene resin (B) being a styrene resin which comprises at least a rubber-modified polystyrene containing a polybutadiene having 90% or higher cis-1,4 bonds, the process comprising:
    a first step of melt-kneading the poly(phenylene ether) (A) and a first styrene resin to thereby obtain a melt-kneading product, wherein the first styrene resin is a styrene resin at least 80% by weight of which is (B1) a rubber-modified polystyrene containing a hydrogenated polybutadiene and/or a styrene homopolymer; and a second step of melt-kneading the melt-kneading product with a second styrene resin, wherein the second styrene resin comprises (B2) a rubber-modified polystyrene containing a polybutadiene having 90% or higher cis-1,4 bonds.

2. The process for producing a poly(phenylene ether) resin composition of claim 1, wherein the polystyrene (B1) comprises a rubber-modified polystyrene containing a partially hydrogenated polybutadiene in which 5-70% of all double bonds have been hydrogenated.

3. The process for producing a poly(phenylene ether) resin composition of claim 2, wherein the second styrene resin further contains a styrene homopolymer.

4. The process for producing a poly(phenylene ether) resin composition of claim 1, wherein (C) a phosphorus flame retardant is further added in the first step in an amount of 1-80 parts by weight per 100 parts by weight of the sum of the poly(phenylene ether) (A) and the first styrene resin.

5. The process for producing a poly(phenylene ether) resin composition of claim 1 or 4, wherein (C) a phosphorus flame retardant and/or other additive(s) are further added in the second step.

6. The process for producing a poly(phenylene ether) resin composition of claim 4, wherein a phosphazene compound is used as the phosphorus flame retardant (C).

7. The process for producing a poly(phenylene ether) resin composition of claim 1 or 4, wherein a polyolefin polymer is further added in the second step in an amount of 0.1-5 parts by weight.

8. The process for producing a poly(phenylene ether) resin composition of claim 1 or 4, wherein a hydrogenated block copolymer derived from a block copolymer having at least one polymer block mainly comprising a vinylaromatic hydrocarbon and at least one polymer block mainly comprising a conjugated diene compound is further added in the second step in an amount of 0.1-15 parts by weight.

9. The process for producing a poly(phenylene ether) resin composition of claim 1 or 4, wherein a hydrogenated block copolymer is further added in the second step in an amount of 0.1-15 parts by weight, the hydrogenated block copolymer being one which has been derived from a block copolymer having at least one polymer block mainly comprising a vinylaromatic hydrocarbon and at least one polymer block mainly comprising a conjugated diene compound and in which (a) the amount of vinyl bonds derived from the conjugated diene compounds in the unhydrogenated block copolymer is 10-70%, (b) the overall degree of hydrogenation of the unsaturated double bonds derived from the conjugated diene compounds is 60-85%, and (c) the content of monomer units derived from the vinylaromatic hydrocarbons in the unhydrogenated block copolymer is 20-60% by weight.

10. The process for producing a poly(phenylene ether) resin composition of claim 1 or 4, wherein intermediate material pellets are produced after the melt kneading in the first step, and the intermediate material pellets are subjected to the melt kneading in the second step.

11. The process for producing a poly(phenylene ether) resin composition of claim 1 or 4, wherein a phosphorus compound antioxidant is added in the second step.

12. The process for producing a poly(phenylene ether) resin composition of claim 11, wherein the phosphorus compound antioxidant to be added in the second step is a pentaerythritol diphosphite compound.

13. The process for producing a poly(phenylene ether) resin composition of claim 11, wherein the phosphorus compound antioxidant to be added in the second step is bis(2,6-di-t-butyl-4-methylphenyl) pentaerythritol diphosphite.

14. A poly(phenylene ether) resin composition obtained by the process of claim 1 or 4.

15. The poly(phenylene ether) resin composition of claim 14, which has a glass transition temperature of −85° C. or lower, the glass transition temperature being attributable to the polybutadiene having 90% or higher cis-1,4 bonds.

16. An exterior part for a large television receiver or large copier, the exterior part comprising the poly(phenylene ether) resin composition of claim 14.

17. An exterior part for a large television or large copier comprising a poly(phenylene ether) resin composition obtained by the process of claim 11.

* * * * *